Dec. 20, 1966  W. S. MATTSON  3,292,427
ANALYSIS APPARATUS
Filed Oct. 12, 1964  2 Sheets-Sheet 1
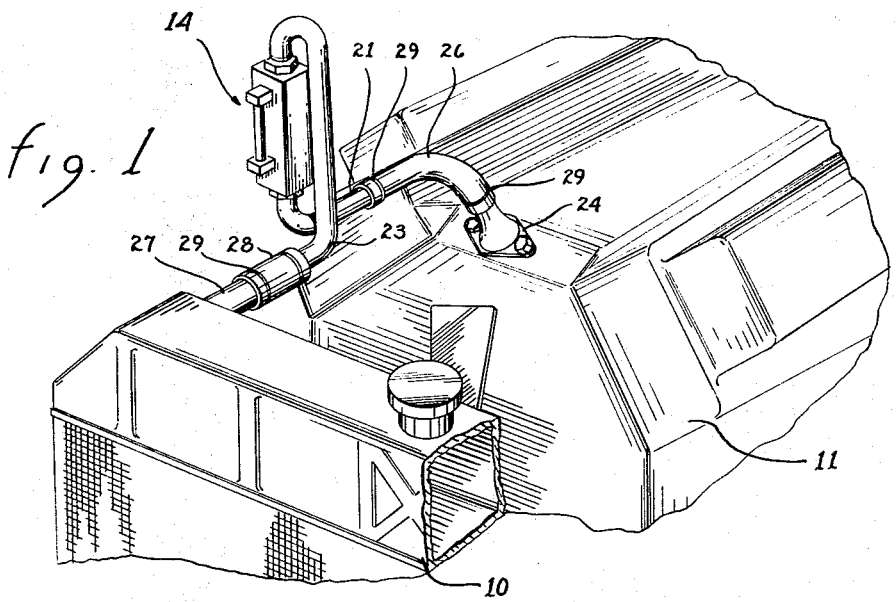
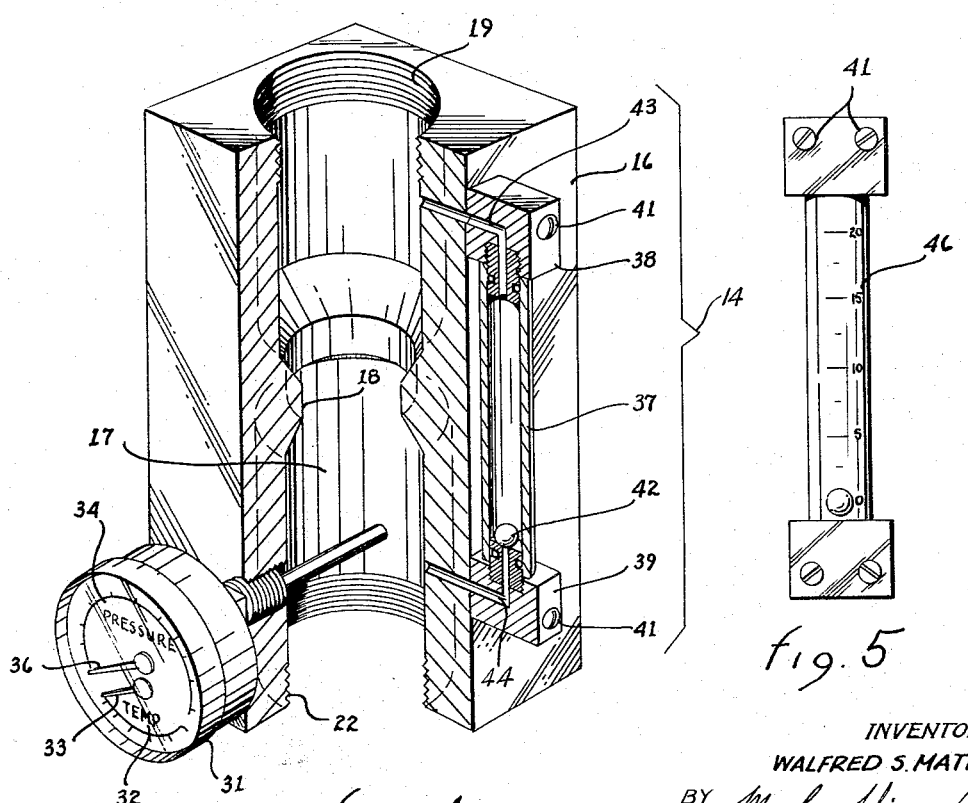
INVENTOR
WALFRED S. MATTSON
BY
ATTORNEYS Dec. 20, 1966 W. S. MATTSON 3,292,427
ANALYSIS APPARATUS
Filed Oct. 12, 1964
2 Sheets-Sheet 2

INVENTOR
WALFRED S. MATTSON
BY McLaughlin & Cahill
ATTORNEY

United States Patent Office 3,292,427
Patented Dec. 20, 1966

3,292,427
ANALYSIS APPARATUS
Walfred S. Mattson, 7302 E. Latham,
Scottsdale, Ariz. 85257
Filed Oct. 12, 1964, Ser. No. 403,109
1 Claim. (Cl. 73—118)

My invention relates to Analysis Apparatus. It relates more in particular to apparatus for analyzing problems arising in connection with the cooling systems of automobiles and automobile radiators.

The usual family automobile has an internal combustion engine cooled usually by water through a radiator, the water being pumped through passageways in the engine block then to the top of the radiator and from the bottom of the radiator back into the engine block. A fan draws cooling air through the radiator, and as the automobile moves forwardly, some air is also forced through the radiator because of the movement of the automobile itself. Engine performance is affected very greatly by the temperature at which the engine operates, and cooling systems are, therefore, very important in the operation of a car. Heretofore, when some kind of problem would arise, such as overheating of the water in the cooling system, the mechanic who would be consulted with respect to the problem had no positive way of identifying just exactly what the problem was. To be sure, a good mechanic could by careful analysis of some features of the system come to some reasonable conclusion as to the probability of where the trouble existed, but it was usually almost impossible for him to determine with certainty exactly where the trouble was, particularly in the case of certain types of trouble. It is for this reason that many times a water pump has been replaced, a thermostat in the radiator has been replaced or some other repair has been undertaken without resolving the trouble which the driver has been experiencing.

The principal object of my invention is the provision of apparatus by means of which a competent mechanic can determine with precision exactly where the problem in the cooling system exists and what can be done to remedy the problem.

Another object of the invention is to provide apparatus of the type identified in which the source of the problem can be made apparent to the owner of the automobile so that he will feel assured that the remedy suggested to him is the right one.

Still another object is the provision of apparatus which may readily be inserted in an automobile cooling water circuit and operated while the motor is running to determine exactly what the cause of the trouble may be which the driver has been experiencing.

Other objects and features of the invention will be apparent from the following detailed description taken with the accompanying drawings wherein FIG. 1 is a fragmentary perspective view showing a part of an automobile block and radiator, and illustrating the manner in which the apparatus of my invention may be mounted in place for performance of its functions;

FIG. 4 is an enlarged fragmentary perspective view showing the transparent housing forming a principal part of the apparatus of my present invention;

FIG. 5 is a fragmentary elevational view showing the flow meter, and

Figure 3:
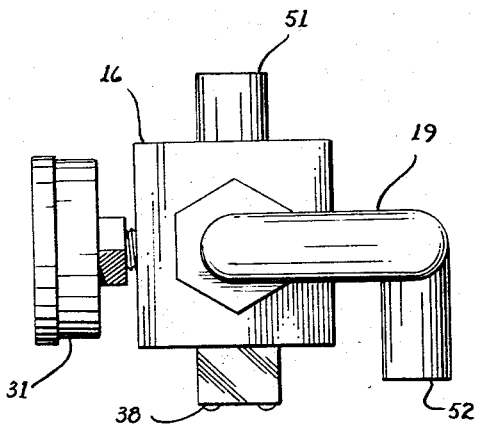
FIG. 3 is a plan view looking down directly on the instrument.
Figure 2:
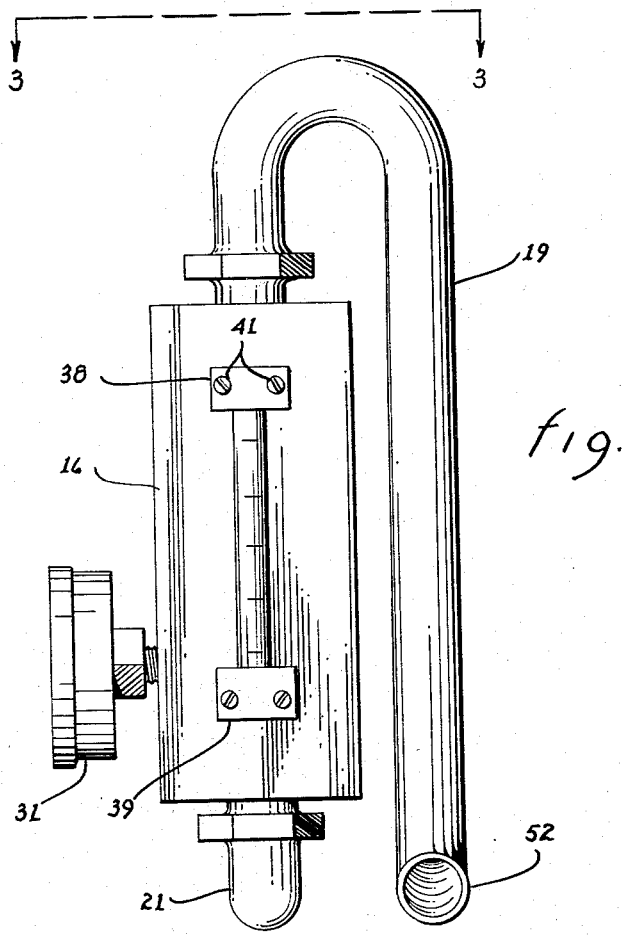
FIG. 2 is an elevational view looking at a different angle than FIG. 1 showing structural features.

Referring now to the drawings, I show a radiator 10 in more or less schematic form and an engine block 11 also in more or less schematic form. A fixture normally connects an inlet pipe on the radiator to the outlet of the cooling passageway in the motor block, but in the present case the apparatus or device of my present invention indicated generally by the reference character 14 is mounted in this position.

Referring now further to the drawings, the device of my present invention includes a generally rectangular block 16 which may be formed of any suitable transparent material such as plastic. It has a vertical passageway 17 running from top to bottom with a restricted diameter portion 18 approximately at its medial line. Internal threads 19 are adapted to be connected to a pipe 21, and interior threads 22 at the opposite end are adapted to be connected to a pipe 23. The motor block has the usual type of fixture 24 at its upper front end and this is adapted to be connected to the pipe 21 by hose 26. The pipe 23 is adapted to be connected to the top radiator intake pipe 27 by means of a hose 28. Suitable means for providing a seal such as clamps 29 may be employed, but if desired the hoses 26 and 28 may be left permanently connected to pipes 21 and 23. Normally the water to be cooled leaves the engine block and is delivered directly to the top of the radiator through a hose connected to the pipe 27, but in the present case the instrument 14 is inserted in this location in a very simple expeditious manner, so that the water entering the hose 26 moves through the pipe 21, upwardly through the transparent block 16, into the pipe 23 and then through the hose 28 into the radiator pipe connection 27. When the instrument is connected into the system in the manner shown and described, the automobile cooling system works in exactly the same way that it would work if the pipe 27 and fixture 24 were connected directly together by means of an upper hose connection as in the usual manner.

A single instrument has a dial 32 and movable hand 33 to show water temperature, as well as a dial 34 and hand 36 to show pressure. This is a standard type of instrument which may be purchased on the market and is made by more than one manufacturer.

At the side of the block 16 I provide a sight glass 37 connected at its ends to anchoring blocks 38 and 39 which are secured to the block 16 by screws 41. The interior of the tube or sight glass 37 is slightly tapered and has a ball 42 therein which is adapted to be lifted a distance in the glass 37 depending upon the speed at which water is moved through it. A top passageway 43 connects the inside of the glass 37 to the tubular passageway 17 above the restricted area 18; while a similar bottom passageway 44 connects the lower end of the glass 37 with the passageway 17 below the restricted portion 18. The main body of water, of course, moves upwardly through the passageway 17, but a pressure differential is produced by the restricted opening 18 which causes part of the water to flow through the passageway 44 and 43 and through the glass 37. A gauge 46 has a number of major subdivisions, each identified by a numeral with smaller subdivisions representing divisions of the portion between the numerals into a given number of equal parts such, for example, as five, so that one could read five, six, seven, eight, nine and ten, for example, on the gauge. Suitably calibrated, this gauge can be made to show the number of gallons per minute of water passing through the passageway 17 which, of course, is the total amount of water delivered by the water pump through the system.

Assuming that there is a problem of overheating or almost any problem in the cooling system of an automobile, and assuming that the instrument is connected in the manner shown in FIG. 1, its operation may be carried out as follows:

Starting with the motor cold, the usual radiator thermostat (not shown) will be closed, and there will be substantially no flow of water through the system. When the radiator opens, however, because of the action of the thermostat, the temperature of the water at the time of opening of the thermostat may readily be determined, and it is possible by this means to tell whether or not the thermostat is functioning properly. Normally, also, when the thermostat opens there is a drop in temperature of the cooling water, but as the engine continues to run the water temperature is increased until it reaches an equilibrium, depending upon the conditions under which it is being operated. By observing the instrument, particularly the gauge 31, one can tell exactly how the temperature of the water changes during normal operation and determine whether or not the water is at the proper running temperature.

Sometimes the problem in the cooling system is caused by a defective water pump which does not produce enough flow of water for accurate cooling. Because of the restricted passageway 18, some of the water is caused to flow through the gauge 37 and as this water flows it raises the ball 42 to a position which can be read along the scale 46. As already pointed out, the entire mechanism including the scale is constructed and calibrated to show gallons of flow of water per minute. Knowing the capacity of the water pump during operation at a given speed, the mechanic can instantly determine whether or not the water pump is defective by observing the amount of flow.

Overheating is also caused sometimes by so-called "liming up" of the radiator core by the deposit of hardening chemicals from the water, usually calcium carbonate or a mixture of calcium carbonate with some other chemicals. When this condition occurs, it is normally shown by the gauge pressure because the water pump must under these conditions pump against a greater back pressure and the pressure of the water in the system will be increased. Sometimes there will also be a slight diminution of flow of the water, depending upon the extent to which the core has been limed up, but experience makes it possible to readily determine whether or not the problem is caused by a defective water pump or a clogged condition of the radiator core. When the latter is found to be the case, the core is removed and usually by back flushing satisfactory operating conditions can be restored.

Looking now further to the actual construction of the instrument, it will be noted that the inlet pipe 21 has an open end 51 facing directly horizontally and toward the hose connection 26 when the instrument is in the position shown in the drawings. Similarly, outlet pipe 19 has an open end 52 curved to face in just the opposite direction. It may be noted by reference to FIG. 3 that these two openings are not directly aligned in the embodiment of the invention shown, but the pipes may be so shaped as to align them exactly with each other. This may be advisable at times when space is at a premium.

Also to point out that for convenience and simplicity of construction with available materials, I have used a clear plastic block 16 and thin walled copper tubing for the pipes 19 and 21 such as commonly used in some types of water handling insulations. If desired, the block 16 and pipes may be formed of a single piece of material such as by injection molding of a plastic, but the particular method of construction and exact dimensions are not of importance so long as the essential functions are obtainable.

I have described my invention in detail so that those skilled in the art may understand the manner of practicing the same, but the scope of the invention is defined by the claim.

I claim:

An instrument for analyzing the operation of liquid cooling systems for internal combustion engines, said system including
  an engine block having cooling liquid channels therein,
  a liquid cooling radiator,
  a liquid pump for circulating cooling liquid through said channels and thence through said radiator, and
  conduit means connecting said channels, said radiator and said pump to form a closed liquid circuit,
said instrument comprising in combination in an integral instrument:
  (1) a transparent body portion having a liquid passageway therethrough;
  (2) conduit means for connecting said passageway in series between the engine block and the radiator in said closed liquid circuit;
  (3) a temperature indicator carried by said body portion having its sensitive element disposed in said passageway;
  (4) a pressure indicator carried by said body portion having its sensitive element in communication with said passageway;
  (5) a cooling liquid flow rate indicator carried by said body portion having its flow rate sensitive element disposed in said passageway.

References Cited by the Examiner

UNITED STATES PATENTS

| | | | |
|---|---|---|---|
| 1,802,278 | 4/1931 | Schaich | 73—347 X |
| 2,018,403 | 10/1935 | Hussar | 73—118 |
| 2,439,723 | 4/1948 | Engdahl | 73—211 X |
| 3,066,530 | 12/1962 | Stenberg | 73—209 X |
| 3,196,673 | 7/1965 | Carson | 73—118 |
| 3,209,595 | 10/1965 | Harland | 73—345 |

LOUIS R. PRINCE, *Primary Examiner.*

D. M. YASICH, *Assistant Examiner.*